(12) United States Patent
West et al.

(10) Patent No.: US 6,446,175 B1
(45) Date of Patent: Sep. 3, 2002

(54) STORING AND RETRIEVING DATA ON TAPE BACKUP SYSTEM LOCATED AT REMOTE STORAGE SYSTEM SITE

(75) Inventors: Christopher J. West, Boulder; David G. Beal, Longmont, both of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/362,481

(22) Filed: Jul. 28, 1999

(51) Int. Cl.$^7$ .............................................. G06F 11/00
(52) U.S. Cl. ...................................... 711/162; 711/161
(58) Field of Search ................................. 711/161, 162

(56) References Cited

U.S. PATENT DOCUMENTS

| | | | |
|---|---|---|---|
| 5,155,845 A | * 10/1992 | Beal et al. ...................... | 714/6 |
| 5,555,371 A | * 9/1996 | Duyanovich et al. .......... | 714/13 |
| 5,623,599 A | * 4/1997 | Shomler ....................... | 714/18 |
| 5,692,155 A | * 11/1997 | Iskiyan et al. ............... | 711/162 |
| 5,835,954 A | * 11/1998 | Duyanovich et al. ........ | 711/162 |
| 6,131,148 A | * 10/2000 | West et al. .................. | 711/162 |

* cited by examiner

*Primary Examiner*—Reba I. Elmore
(74) *Attorney, Agent, or Firm*—Merchant & Gould; Wayne P. Bailey

(57) ABSTRACT

A storage control system and method for storing and retrieving data to and from a tape backup system that is located remotely from a primary host system. The primary system is coupled to a remote storage system for remote copy applications. The tape backup system is coupled to the remote storage system and operated at the remote site. Conducting control signals through the primary storage controller to the remote storage controller enables control over the tape backup system from the local or primary site. Data can be backed up to the tape system from the remote storage site which enables the local host to perform applications during the backup window. Data can also be restored from the tape system to the remote storage system and transferred back to the primary system via the communications link.

32 Claims, 6 Drawing Sheets

STORING AND RETRIEVING DATA ON TAPE BACKUP SYSTEM LOCATED AT REMOTE STORAGE SYSTEM SITE

BACKGROUND OF THE INVENTION

1. Field of the Invention

The present invention relates generally to data storage subsystems, and more particularly to methods of storing and retrieving data to and from tape backup systems and data storage subsystems.

2. Description of Related Art

U.S. patent application Ser. No. 09/274,789, filed Mar. 23, 1999, entitled ASYNCHRONOUS SHADOWING IN DATA STORAGE SUBSYSTEM, applicant, Christopher J. West and U.S. Patent Application filed concurrently herewith, entitled RETRIEVING DATA FROM A DATA STORAGE SUBSYSTEM, applicants, Christopher J. West and David G. Beal, are specifically incorporated herein by reference for all that they disclose and teach.

In today's competitive business environment, a business must diligently protect its assets, including the data stored within its computer network. Safeguarding corporate data, including engineering designs, pricing information, corporate procedures, customer and vendor lists, and order information, is crucial to the long-term success of a business. Threats to corporate data include hardware failure, physical plant disasters (e.g., building fires, earthquakes, tornadoes, and hurricanes), theft, and industrial sabotage. Protecting corporate data through backup software helps alleviate the downside of these threats and therefore has become an essential part of managing computer network environments.

Data storage management methods in modem computer networks tend to vary according to different data characteristics and management issues, such as the amount of the data, cost, performance and fault tolerance. One particularly useful method of protecting business data is to periodically copy (or "backup") the data to an archive tape for storage at a remote location. Tape backup systems are typically employed for long-term type storage of data in case something happens to the local storage medium. The typical tape backup process copies all the data from the storage medium onto a series of tapes, usually referred to as a tape library.

Tape backup systems are connected to the local storage medium, such as a disk array, and to a local application host computer system which is used to control and manage tape backup procedures. Following a typical backup procedure, the tapes are shipped to a remote location as a precaution against physical catastrophe to the local building or structure which would most likely damage the disk array and the tape library. The tape backup process is conducted as often as necessary for the given application, but usually occurs once a day, and typically at night when the host computer is not accessing the primary storage controller since the backup process is relatively time consuming.

One particular drawback associated with tape backup systems is that the application host system cannot access the disk array during the tape backup procedure, i.e., during the "backup window." Even if the host system has some access to the disk array during the backup window, that access is usually quite limited and slows down the backup procedure significantly. Consequently, the host system is generally not used during the backup window creating a period of time wherein no operations are performed by the host application system. Moreover, backup procedures utilizing the tape system are typically performed as infrequently as possible in order to reduce the impact on the host system.

Another drawback associated with the normal tape backup procedure involves the retrieval of information from the tape library. Since the tapes are shipped to a remote location, the retrieval of data from a tape typically begins with the physical transportation of the tapes back to the local site. Once the tapes are received at the local site, the library must be attached to the system and the information must be located and downloaded back to the system. Locating and downloading data from the tape monopolizes the host application system and prevents other processes from being performed by the host system during the retrieval process. The inability to perform normal operations notably impacts host performance since data location and downloading procedures typically consume a significant amount of time.

Another disadvantage associated with typical tape backup systems relates to the fact that the tapes must be shipped from the primary site to the secondary, remote site. Such shipping involves additional time, effort and cost.

Alternative disaster-relief backup solutions involves substantially real-time archival of data. Such systems are generally referred to as "remote copy systems", wherein data is recorded fairly contemporaneously to a primary storage medium and a secondary storage medium located remotely from the primary site. The secondary storage medium, such as a disk array, is part of a remote, secondary storage system or subsystem that is connected to the primary storage system by a communications link. Data is transferred from the primary storage system to the secondary storage system using the communications link. The information on the secondary system is typically a relatively current copy of the data on the primary system.

Existing remote copy schemes include Peer to Peer Remote Copy (PPRC), which involves the synchronous propagation of information to the secondary system as changes occur, and Extended Remote Copy (XRC), which provides for asynchronous copying of information to the secondary system. The XRC approach copies portion of a primary volume, i.e., virtual disk, to the secondary system at predetermined intervals to provide improved access to the primary volume over the PPRC synchronous scheme. A third remote copy process involves the creation of a bridge or "snap volume" which is a copy of the primary volume. The snap volume is used to copy information to the secondary system which allows the host system to substantially fully access the primary volume at all times. This third process is referred to as data "shadowing" and is described in detail in the above referenced, co-pending patent application titled ASYNCHRONOUS SHADOWING IN A DATA STORAGE SUBSYSTEM.

Remote copy systems provide some notable benefits over the normal tape back up system. For example remote copy solutions provide the ability to create a substantially current backup of information at another site without the time consuming tape backup procedure. Moreover, the remote copy process involving the snap volumes occurs with minimal impact on the host system.

Unfortunately however, since the remote systems are designed primarily to provide disaster relief (such as when the local building is destroyed) these systems do not provide for the "retrieval" of information related to day-to-day type situations. Thus, to retrieve information from the remote system, selected information must be copied to a storage medium and physically transported to the local site, and downloaded to the local disk array. This process is similar to the tape system retrieval process with the added step of copying the information to the storage medium. As stated above, this type of retrieval is time consuming and significantly impacts the host application system.

Moreover, remote copy systems do not provide the longer-term type storage that tape systems provide. That is, since the secondary storage system has only one storage medium, i.e., disk array, at the remote site, the information on this disk array changes daily and almost as quickly as the information changes on the primary storage system. Longer term storage provides many benefits and consequently, many organizations employ both a remote copy system and a tape backup system while simply contending with the inadequacies of each.

It is with respect to these and other considerations that the present invention has been made.

SUMMARY OF THE INVENTION

The present invention provides a method and system providing a tape backup system at a remote location connected to a remote copy system to enhance the tape backup system functionality. An aspect of the present invention relates to a tape backup system wherein the backup copying of information to tape occurs remotely so tapes do not have to be shipped to a remote site. Another aspect of the present invention relates to a tape backup system wherein the tape backup procedure occurs while minimizing the impact on the host computer and its ability to access the local disk array. Yet another aspect of the present invention relates to a tape backup system incorporating taped data that is accessible to the host computer without physically shipping tapes to the host computer site.

In accordance with preferred aspects, the storage control system of the present invention has a primary storage system which has at least one local storage disk and a primary storage controller for controlling the allocation of data located on the local storage disk. The system also incorporates a remote storage system having at least one remote storage disk, and a secondary storage controller for controlling the allocation of data on the remote storage disk. The secondary controller is coupled to the primary storage controller to receive control signals from the primary storage controller. The secondary storage controller is also adapted to receive data transmissions from the primary storage controller and copy the data to the remote storage disk. The system also has a tape backup system located at the remote site and coupled to the secondary controller. The tape backup system is adapted to receive control signals from the secondary controller and data transmissions from the secondary controller. The tape backup system copies data located on the remote storage disk to the tape medium in response to backup control signals received from the secondary controller. The preferred system further comprises a remote host computer system coupled to the secondary controller and the tape backup system. The remote host computer system receives control signals from the secondary controller and responsively operates the tape backup system to copy data from the remote storage disk to the tape medium.

In accordance with other preferred aspects, the system asynchronously copies the data from the remote storage disk to the tape medium. Additionally, the secondary storage controller further comprises a snap volume to facilitate the asynchronous copying of the data from the remote storage disk to the tape medium.

In accordance with other aspects, the present invention relates to a storage control system for retrieving a remote copy of data from a tape medium wherein the system also comprises a primary storage system and a remote storage system. Again, the tape backup system having a tape medium is located at the remote site and coupled to the secondary controller. The tape backup system adapted to receive control signals from the secondary controller and to copy data from the tape medium to the remote storage disk in response to restore control signals from the secondary controller. Moreover, the secondary controller is adapted to transmit the information stored on the remote storage disk by the tape backup system to the primary storage controller to thereby create a local copy of the information on the remote tape backup system for use by the primary system.

In accordance with yet other preferred aspects, the present invention is adapted to store and retrieve selected portions of one or more volumes of information during a particular storing or restoring process. Additionally, the secondary storage controller is adapted to transfer the point-in-time copy located on the remote storage disk as indicated by a lookup table if such a valid copy exists in response to request for a point-in-time copy prior to searching the tape backup system.

The present invention also relates to methods of storing and retrieving data to a tape backup system to a primary storage system, wherein the tape backup system is remotely located from the primary system. The methods comprise the steps of coupling the tape backup system to a remote secondary storage system having at least one remote storage disk and a secondary storage controller and coupling the secondary storage controller to the primary storage system via a communications link. The storing method further comprises the steps of transmitting data from the primary storage system to the secondary storage system and transmitting data from the secondary storage system to the tape backup system, preferably asynchronously, using a snap volume.

The restoring method further comprises the steps of conducting a first restore control signal from the primary storage controller to the secondary storage controller and conducting a second restore control signal from the secondary storage controller to the tape backup system in response to the first restore control signal. Additionally, the method involves the copying of data located on the tape medium to the remote storage disk as controlled by the secondary storage controller in response to the second restore signal thereby creating a remote point-in-time copy on the remote storage disk and transferring the data associated with the remote point-in-time copy from the secondary storage controller to the primary storage controller thereby creating a local point-in-time copy. Preferably the secondary controller searches the remote disk array for a valid remote point-in-time copy prior to conducting the second restore control signal. If a valid remote point-in-time copy is found, the secondary controller transfers the point-in-time copy to the primary storage controller. If a valid remote point-in-time copy is not found, the secondary controller conducts the second control signal from the secondary controller to the remote host computer system.

These and various other features as well as advantages which characterize the present invention will be apparent from a reading of the following detailed description and a review of the associated drawings.

DETAILED DESCRIPTION OF THE PREFERRED EMBODIMENT

Embodiments of the invention described herein are generally implemented as logical operations in an intelligent controller in a storage control system. The logical operations of the present invention are implemented (1) as a sequence of operations directed by program instructions running on an intelligent controller, and (2) as interconnected machine or circuit modules within the intelligent controller. The implementation is a matter of choice, dependent on the performance requirements of the intelligent controller implementing the invention. Accordingly, the logical operations making up embodiments of the present invention described herein are referred to variously as operations, steps, and modules.

Figure 1:
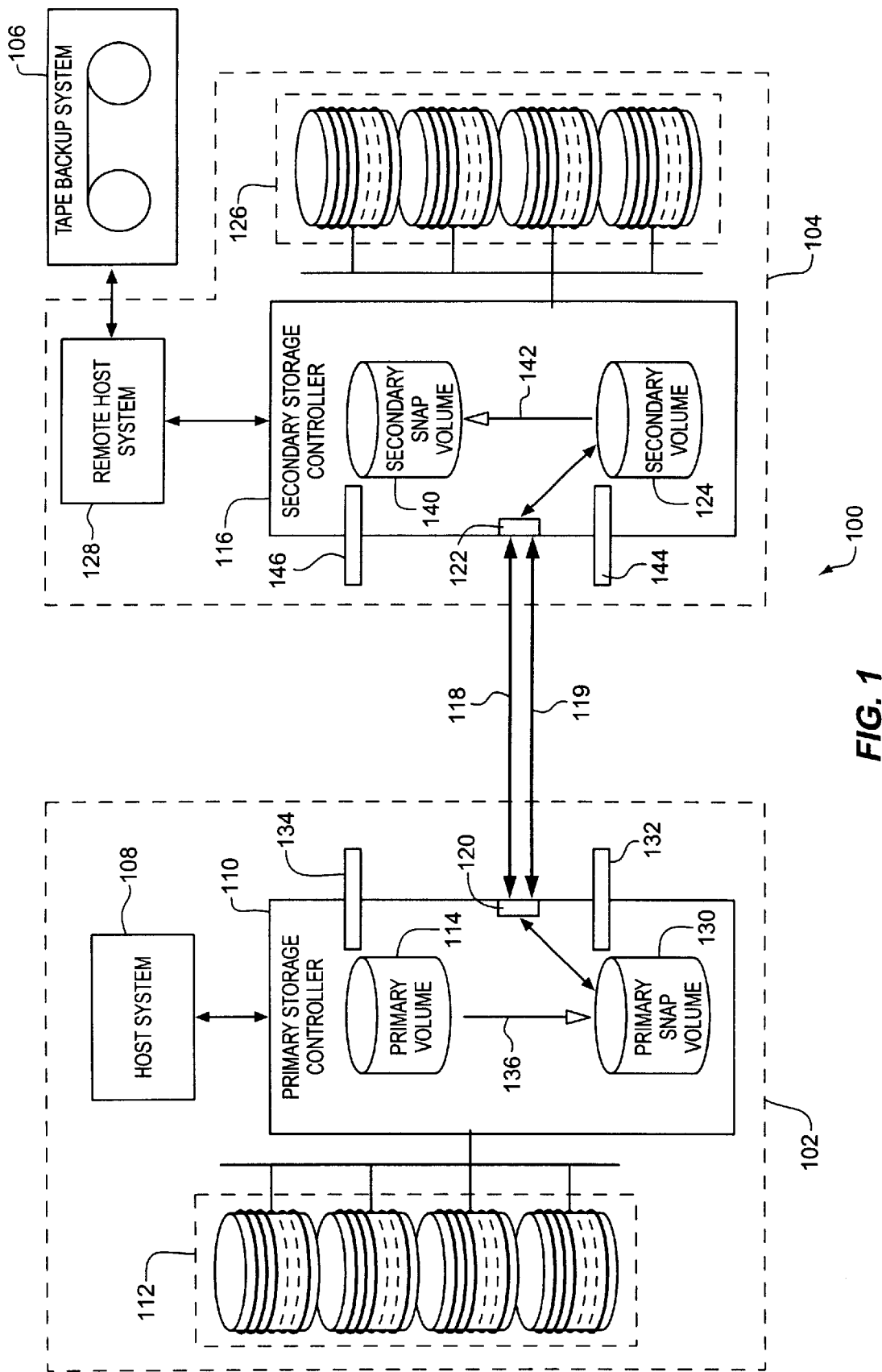
FIG. 1 is a block diagram of a computer system embodying the present invention, the computer system having a local computer system, a remote storage system and a remote tape backup system.

A computer storage control system 100 incorporating an embodiment of the present invention is shown in FIG. 1. The computer system 100 incorporates a local or primary computer system 102, a remote or secondary storage subsystem 104 and a remote tape backup system 106. The secondary system 104 receives copies of data stored on the primary system 102 and stores the data in case of an emergency. The tape backup system 106 is connected to the secondary system 104 and is configured to create a backup of the information stored on the secondary system 104, effectively creating a "point-in-time" backup of the information stored on the primary system 102. Additionally, the tape backup system 106 is configured to restore information to the secondary system 104 when requested. The secondary system 104 is also configured to transmit information to the local computer system 102 upon request.

As shown in FIG. 1, the primary system 102 incorporates an application host system 108, a primary storage controller 110 and a primary storage medium 112 which is preferably a disk array. The system 102 is preferably a server computer system in a client/server environment wherein the application host system 108 performs a significant amount of processing for at least one client computer (e.g., a personal computer or workstation) coupled to it. Alternatively, the application host system 108 may include a personal computer system, a mainframe computer system, or a minicomputer system. The application host system 108 executes an application that must access large amounts of data controlled by the primary storage controller 110. The application host system 108 periodically reads from and writes to the primary storage controller 110 in accordance with program instructions provided by the application and associated system drivers. A microprocessor (not shown) in the application host system 108 executes the program instructions that are typically stored in a storage medium accessible by the application host system 108. The storage medium can include, without limitation, host memory or a local storage disk.

The primary storage controller 110 comprises internal memory for recording virtual disk volumes, such as a primary volume 114. Each volume contains physical location information related to where data is physically stored on the physical storage disks in a disk array 112. i.e., the volumes are "mapped" to the physical data. The primary volume 114 presents to the application host system 108 a virtual disk from which the application host system 108 can read data and write data as though it were accessing a physical disk drive. The primary volume 114 provides a logical interface to the data stored in the disk array 112, regardless of where the data is physically stored within the disk array 112. For example, it is common to allocate a storage track of the primary volume across multiple disks in the disk array 112, using a technique called "striping." As a result, the application host system 108 accesses the primary volume 114 as a continuous disk volume, while the data is physically distributed throughout the disk array 112. Preferably, the storage controller 110 supports multiple volumes associated with the disk array 112. The primary storage controller 110 is coupled to a secondary storage controller 116 of the secondary system 104 via bidirectional links 118 and 119. The links 118 and 119 each comprise at least one fiber-optic cable, such as Enterprise Systems CONnectivity™ (ESCON) connections from IBM Corporation. The primary storage controller 110 includes a communication port 120 and the secondary storage controller 116 includes a communications port 122. The ports 120 and 122 are coupled to the links 118 and 119 to provide inter-controller communications. The data of the primary volume 114 is communicated to a secondary volume 124 and a secondary disk array 126 associated with the secondary controller 116 through the link 118. The secondary volume 124 represents a virtual disk of remote data stored in the secondary disk array 126. A recovery or secondary host system 128 is coupled to the secondary storage controller 116 to perform recovery and other operations. In accordance with the present invention the secondary system is used to both receive data from the primary storage controller 110 and to transmit data information to the primary storage controller 110 when requested.

The links 118 and 119 are used to transfer data back and forth between the two storage controllers 110 and 116. Additionally, the link 118 facilitates the transfer of commands and requests from the primary host computer 108 and primary storage controller 110 to the secondary host computer 128 and secondary storage controller 116. Preferably, link 118 is used to transfer data and commands such as requests to the secondary controller 116 and the link 119 is used to transfer data and other information to the primary storage controller 110. Using two bidirectional links 118 and 119 reduces traffic associated with other embodiments (not shown) that use only one bi-directional link and facilitates more options than other embodiments (not shown) that use two unidirectional links.

The tape backup system 106 is connected to the secondary host computer 128. The tape system 106 is preferably a tape robotic library. Tape mounting is controlled through host software located in the host system 128 that accesses a catalogue or table indicating where data is stored on tape and how the data relates back to the disk volume. If a robotic library is not used, an operator must load tapes as directed by the remote host system 128.

The tape system 106 is configured to copy information from the secondary disk array 126 onto computer storage tapes (not shown) and therefore provide a backup copy of the information. Moreover, the tape system 106 is also configured to restore information from one or more of its tapes (not shown) to the secondary system 104 when requested. Preferably, the tape system 106 is driven by the secondary host computer 128 which manages and controls the tape backup process.

Figure 2:
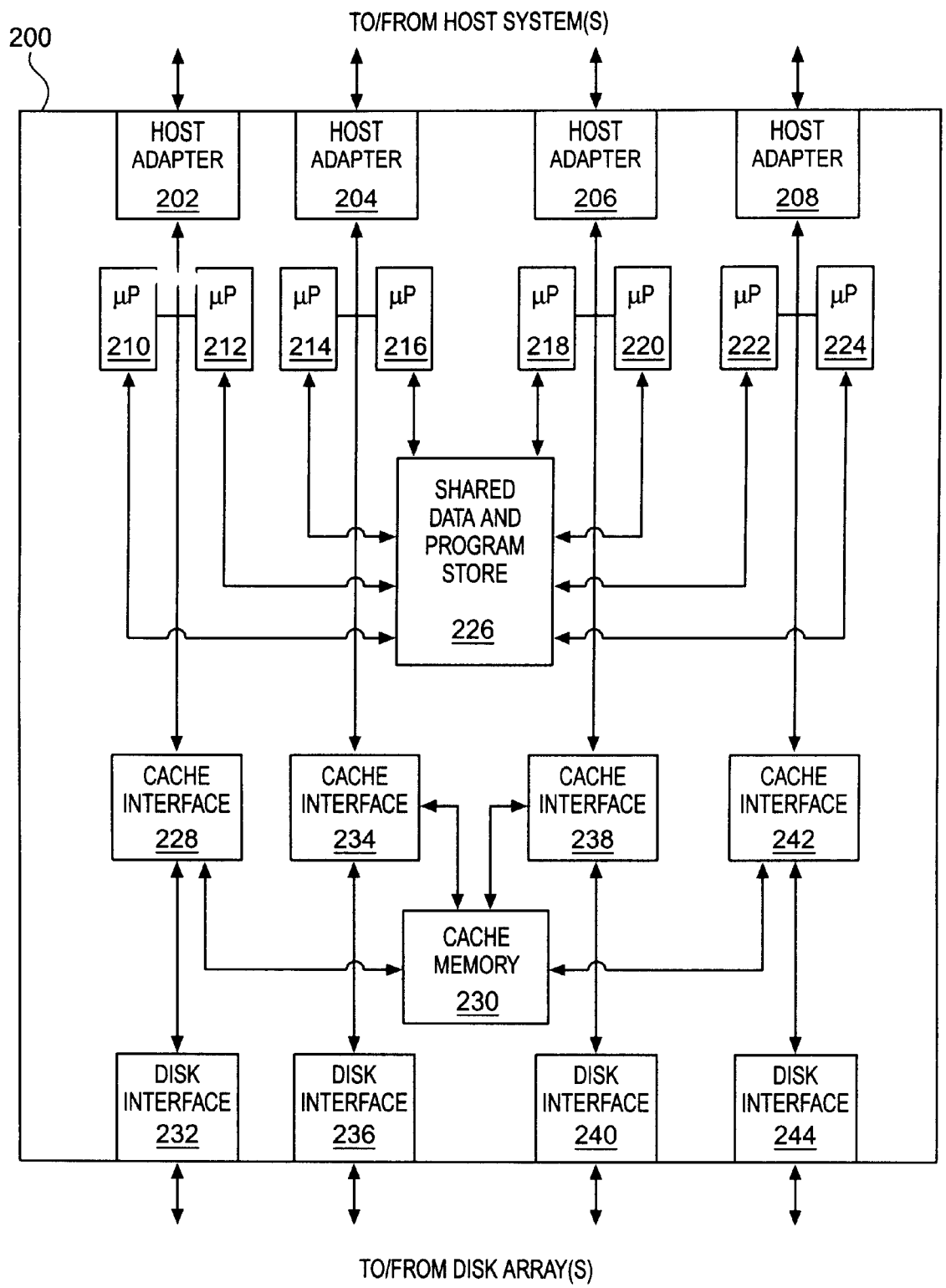
FIG. 2 is a block diagram of an exemplary intelligent storage controller implemented as part of the local computer system and as part of the remote storage system shown in FIG. 1.

FIG. 2 depicts a block diagram of an exemplary storage controller 200, such as 110 and 116 shown in FIG. 1. The storage controller 200 includes host adapters 202, 204, 206, and 208. The host adapters are coupled to host systems, such as the application host system 108 and the recovery host system 128 or to other peripheral items such as the links 118 and 119 (FIG. 1). Microprocessors 210 and 212 process data communicated through the host adapter 202 in accordance with program instructions stored in a shared data and program store 226. In an alternative embodiment, each microprocessor is coupled to an individual memory device including program instructions and data. Preferably, the program instructions are downloaded to the shared data and program store 226 by a support processor (not shown). The shared data and program store 226 (alternatively referred to as shared memory) stores the logical representation (e.g., pointers) of at least one virtual disk volume controlled by the controller 200. The data communicated through host adapter 202 is also communicated through a cache interface 228 to cache memory 230 or to a disk interface 232. The disk interface 232 communicates data to and from the cache interface 228 to a disk array (not shown) such as disk array 112 or 126 (FIG. 1). In a preferred embodiment of the present invention, the disk interface 232 is a communications port, such as an ESCON port, to a fiber-optic cable.

A second set of components includes the host adapter 204, microprocessors 214 and 216, a cache interface 234 and a disk interface 236. Another set of components includes the host adapter 206, microprocessors 218 and 220, a cache interface 238, and a disk interface 240. Yet another set of components includes the host adapter 208, microprocessors 222 and 224, a cache interface 242 and a disk interface 244. It is to be understood that data from one host adapter can be communicated through any disk interface in the storage controller. Likewise, it is to be understood that data from a disk interface can be communicated through any host adapter in the storage controller. Furthermore, a virtual disk volume defined in the cache memory 230 can be accessed through any host adapter in the storage controller 200 and can logically map to any disk in any disk array coupled through the disk interfaces 232, 236, 240 and 244. Through this flexibility, the storage controller 200 and associated applications provides a powerful means of managing large amounts of storage. In effect, the complicated distribution of physical storage is abstracted and presented to an application as a virtual disk volume. In this manner, the configuration of physical storage is essentially irrelevant because the virtual disk provides a consistent interface for applications that access it.

Referring back to FIG. 1, the primary storage controller 110 creates the primary volume 114, which maps data stored in the disk array 112 and thus provides the physical location information related to that data. The host system 108 is coupled to the primary storage controller 110 to access data represented by the primary volume 114. The host system 108 configures the primary storage controller 110 to perform asynchronous copying of data written to the disk array 112 and represented by the primary volume 114 to remotely copy data to the secondary storage controller 110. Asynchronous copying involves the storing of changes on the primary controller and, every so often, transferring the changes to the secondary system. In this manner, the changes are not automatically propagated to the secondary system as they occur, as in the synchronous remote copying scheme. A preferred method of asynchronously copying data to the secondary system is described in detail in the co-pending application titled ASYNCHRONOUS SHADOWING IN DATA STORAGE SUBSYSTEM and referenced above.

In general, in order to achieve the asynchronous copying function, the host 108 establishes a peer to peer connection between volumes 114 and 124, on command or on predetermined periodic intervals, and conducts control signals to the primary storage controller 110 instructing the transmission of data to the secondary storage controller 116. The secondary storage controller 116 receives the data, typically the changes made since the last transmission, and facilitates the storage of the data on the secondary disk array 126. Additionally, the secondary volume 124 is maintained to provide a mapping of the physical location information of the corresponding data on the secondary disk array 126. Preferably each volume located in the primary storage controller corresponds to a volume on the secondary storage controller, wherein the two corresponding volumes are referred to as a pair.

In a preferred embodiment, the data is asynchronously transmitted to the secondary system 104 so that a remote point-in-time copy of the data on the secondary disk array 126 is readily identifiable. Information related to which volume was transferred to the remote location and the time of the transfer is stored in the shared data and program store, (such as 226 in FIG. 2) of the primary storage controller. The time intervals used for transferring the data to the remote location are preferably configurable and thus determinable by the user of the host system 108. Additionally, storing of data to the tape backup system 106 is also done asynchronously to minimize impact on the operations of the system 100.

Alternatively, the information could be conducted to the secondary system 104 synchronously. Synchronous copying relates to a remote copy system that, for each write access, the primary disk array 112 is modified and then the secondary disk array 126 is modified. In fact, the secondary disk array is modified and then the application host 108 receives acknowledgement of completion of the write operation. Therefore, during synchronous conduction, the host computer 108 cannot access that primary virtual disk address until the somewhat time consuming task of updating the secondary disk array is complete. Delaying access to the primary volume 114 impacts performance and therefore asynchronous remote copy is preferred.

In order to facilitate the asynchronous transfer of data from the primary storage controller 110 to the secondary storage controller 116 while minimizing the impact on the performance of the host computer system 108, the primary storage controller 110 employs a snap volume 130, as shown in FIG. 1. The snap volume 130 is a copy of the primary volume 114 and therefore contains the same physical location information related to the same data as represented by the primary volume 114. The snap volume 130 is then used to transfer data to the secondary controller 116, freeing the primary volume to be accessible to the host system 108 during the actual data transfer to the secondary controller 116.

To create the snap volume, the primary storage controller 110 is triggered to "snap" information to the snap volume 130 those cylinders of the primary volume 114 that are out-of-sync with the secondary volume 124. In the first instance, all cylinders of the primary volume 114 are out-of-sync with the secondary volume 124, and therefore all populated cylinders of the primary volume 114 are snapped to the snap volume 130. "Snapping" is a process by which the pointers that represent the mapping of a primary volume to the physical storage in disk array 112 are copied from internal memory associated with the primary volume 114 to internal memory associated with a snap volume 130. In contrast to a remote copy of physical data from a primary disk array 112 to a secondary disk array 126, a snap operation does not involve the copy of physical data from the primary disk array and, therefore, occurs relatively rapidly. In this manner, no actual data is copied to the snap volume, even though the snap volume provides a logical mapping to all "snapped" data mapped by the primary volume. A bit map structure 132 is associated with the snap volume 130 to indicate those cylinders of the snap volume 130 that are out-of-sync with the secondary volume 124. After the out-of-sync cylinders are snapped, the bit fields in bit map structure 134, i.e., the bit map structure associated with primary volume 114 are reset and a write complete status is sent back to the application host system. The arrow 136 represents the copy operation (i.e., the snap) of the pointers from the primary volume 114 to the snap volume 130.

The communications link 118 communicates a physical copy of the data stored in the disk array 112 and mapped by the snap volume 130 to the secondary volume 124 located at a remote location, a predetermined distance from the local system 102. In contrast to the snap operation represented by arrow 136, the remote copy from the snap volume 130 to the secondary volume 124 comprises an actual copy of data, which-is physically recorded to the disk array 126. In a preferred embodiment, a remote copy pair is configured between the primary volume 114 and the secondary volume 124 to perform "shadowing" of the data. Furthermore, the snap volume 130 is configured as a target volume for the snapping operation, as an intermediate stage of the shadowing operation. Since the process is asynchronous, a point-in-time copy exists at the secondary system. Alternatively, the primary volume 114 may be used in other embodiments to directly transfer the data to the secondary system 104.

Figure 3:
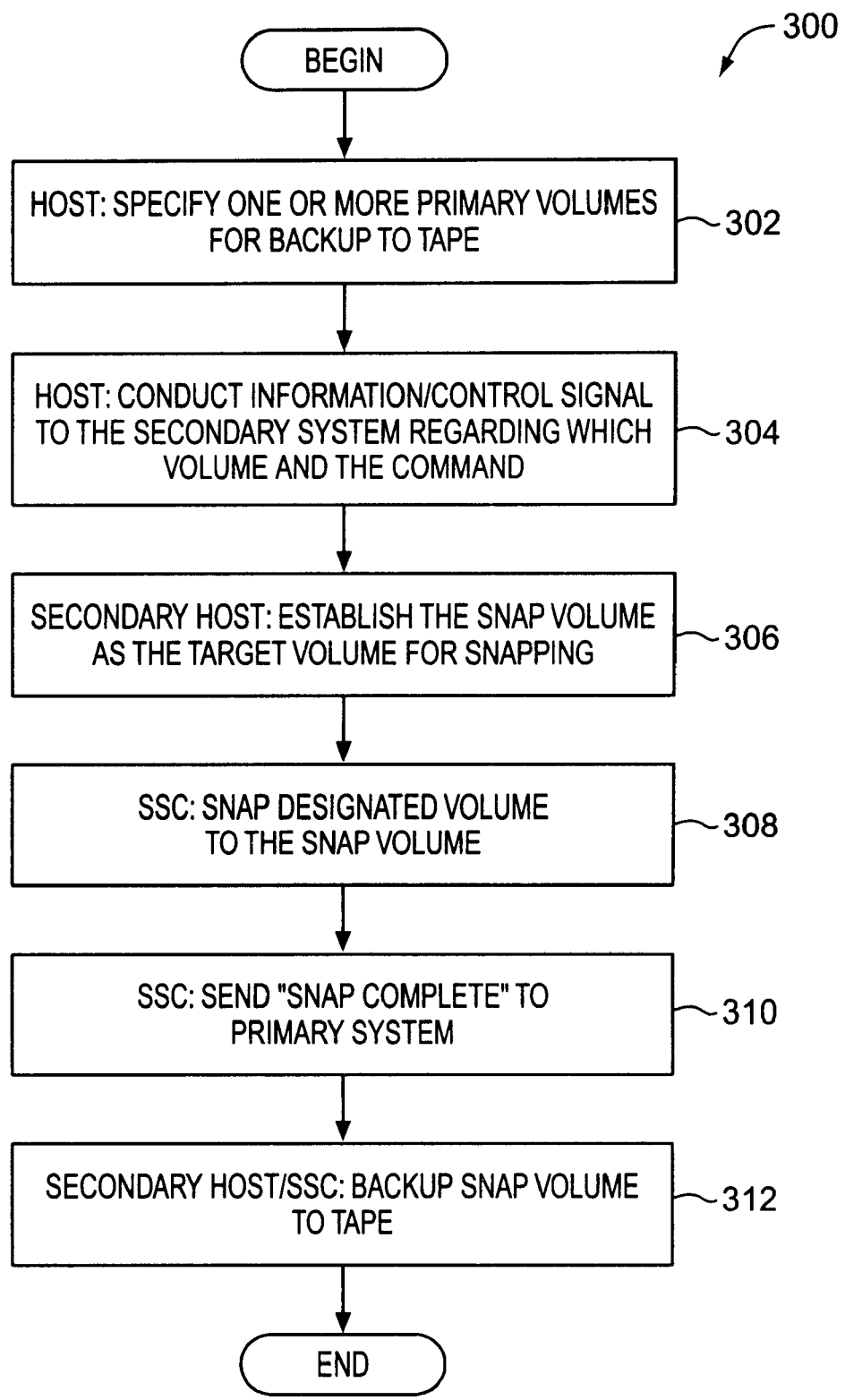
FIG. 3 is a flowchart of operations for performing the operational functions of an embodiment of the present invention wherein data is copied to the remote tape backup system shown in FIG. 1.

The operations for performing a tape backup process 300 in order to create a copy of the data on the tape backup system 106 in accordance with a preferred embodiment of the present invention are shown in FIG. 3. The process 300 is preferably initiated by the host system 108 with designation step 302. Designation step 302 designates the volume, volumes or volume portions which are to be backed up to the tape backup system. In general, this step may be performed by a user at the host application computer 108 or the computer 108 may be configured to automatically select volumes based on predetermined criteria. Or, as may often be the case, the designation step merely designates the entire disk array to be backed up during the backup process 300.

Following designation of the volume or volumes, conduct operation 304 conducts a control signal to the secondary host system 128 to indicate that a tape backup procedure is requested. The host computer 108 generates this control signal and conducts the signal to the primary storage controller 114 which relays the control signal to the secondary controller 116 via link 118. The secondary controller 116, in turn, conducts the signal to the secondary host computer 128. The control signal comprises enough information to enable the secondary host 128 to identify the request and the volumes which are to be copied to the tape system 106. Additionally, the request control signal may also comprise other control information such as when the backup is to take place or what attributes to attach to the volume, among other things.

The secondary host system 128 is configured to be ready to receive the control signal and able to carry out the request. The secondary host 128 is preferably running a software component that allows the secondary controller 116 to interrupt the host 128 and trigger the tape backup process. When the secondary system 104 is ready to have the secondary host begin a copy procedure, the second controller 116 generates an "attention" interruption control signal using well defined ESCON protocols. This "attention" control signal causes the secondary host 128 to query the state of the volume in the secondary controller 116. The query indicates that a backup operation is ready to be conducted by the remote host 128, which writes information to the tape system 106.

Once the secondary host 128 receives the control signal, establish operation 306 causes the secondary storage controller 116 to establish secondary snap volume 140 (FIG. 1) that is initially empty, i.e., does not map to any data. The establishment of the secondary snap volume 140 is similar to the process step that established snap volume 130 by the primary storage controller.

Following establishment of the snap volume 140, snap operation 308 snaps information from a predetermined secondary volume to the secondary snap volume 140 to populate the secondary snap volume. The snap operation 308 is depicted by arrow 142 (FIG. 1). The secondary snap volume 140 preferably represents the information that has been designated for copying to the tape system 106.

As shown in FIG. 1, the secondary snap volume 140 is a copy of the secondary volume 124 and therefore virtually maps to the same data location as the secondary volume 124. The snap volume 140 is then used to transfer data to the tape system 106 by the secondary host 128. Using the snap volume 140, instead of the secondary volume 12, frees the secondary volume 124 to be accessible during subsequent asynchronous data transfers from the primary storage controller 110. The data represented in the secondary volume 124 is a point-in-time copy of the primary volume 114. The primary storage controller 110 may conduct the data to the secondary storage controller 116 immediately prior to the snapping process step 308 or the data may be information that has been stored on the secondary disk array 120 for some time. Alternatively, the secondary storage controller 116 may indicate when the data has changed by a predetermined extent and report such a change to the host system 108, thereby initiating a tape backup request. Additionally, bit map structures 144 and 146 associated with volumes 124 and 140, respectively, can be used to facilitate the snap process as described above with respect to bit map structures 132 and 134.

Upon snapping the information to the snap volume 140, conduct operation 310 conducts a control signal from the secondary storage controller 116 to the primary storage controller 110 indicating that the snap process step 308 is complete and that the secondary volume is available for subsequent data transfers. The primary storage controller 110 either relays this information to the host computer system 108 or stores the information in its cache memory for future reference.

Also, once the snap operation 308 is complete, backup operation 312 begins physically copying data to tapes within the tape backup system 106. This process is controlled primarily by the secondary host 128 which interacts with the secondary storage controller 116, and particularly with the snap volume 140, to access the data on the disk array 126. The secondary host may alternatively read one of the bit map structures 144,146 associated with the either the snap volume 140 or the secondary volume 124 to determine which tracks or cylinders should be copied or written to tape. A "High Speed Data Mover" (not shown) is employed to access the specified tracks and write them to tape. HSDM transfers tracks in compressed from for tape backup storage.

Once the information represented in the snap volume 140 has been copied to the tape system 106, the backup process ends. In an alternative embodiment, other volumes may be subsequently backed up. In such a case flow branches back to operation 306 wherein another snap volume (not shown) is established. Following the establishment of the snap volume, the process steps are repeated until no more volumes are to be backed up. In yet another alternative embodiment, following the completion of operation 312, a control signal is conducted to the host computer 108 reporting that the requested volume has been backed up to the tape system. Upon receiving such a signal, the host computer 108 may conduct another tape backup control signal, indicating another volume to be backed up.

In another embodiment, the secondary storage controller 116 notifies the remote host 128 when a backup procedure should be performed based on information related to updates to the remote data. The remote host 128 is prepared to recognize such a signal from the secondary system.

Partial volumes, extent levels of volumes, full volumes or other variations of identifiable memory locations can be backed up according to process 300. In order to backup partial volumes, bit map information, represented by bit map structures 144 and 146, is sent to the secondary storage controller from the primary storage controller in its backup control signal. The bit map information relates to the precise data or portions of data on the disk array 112. The secondary storage controller 116 correlates the bit map information to actual data located on the secondary disk array 120. Since the location of data on the secondary disk array 120 is not necessarily the same as the location of the corresponding data on the primary disk array 116, some translation may be necessary. Since the secondary volume keeps track of corresponding data locations, the translation is relatively straightforward. In an alternative embodiment, the bit map of information may actually relate to data from more than one volume. Once the precise data is identified, it is backed up to the tape system 106.

An extent level is related to a set of tracks that is to be copied to tape. Sets or ranges of physical tracks are identifiable and therefore can be copied as such. The process of backing up a partial volume using extent information is relatively the same as backing up using a bit map, except the process operates on ranges, instead of a map. The tracks that are backed up may actually comprise information from more than one volume.

If the full volume is to be recovered then merely volume identification is conducted with the request. The secondary controller can therefore identify the volume that is to be backed up, in its entirety.

Figure 4:
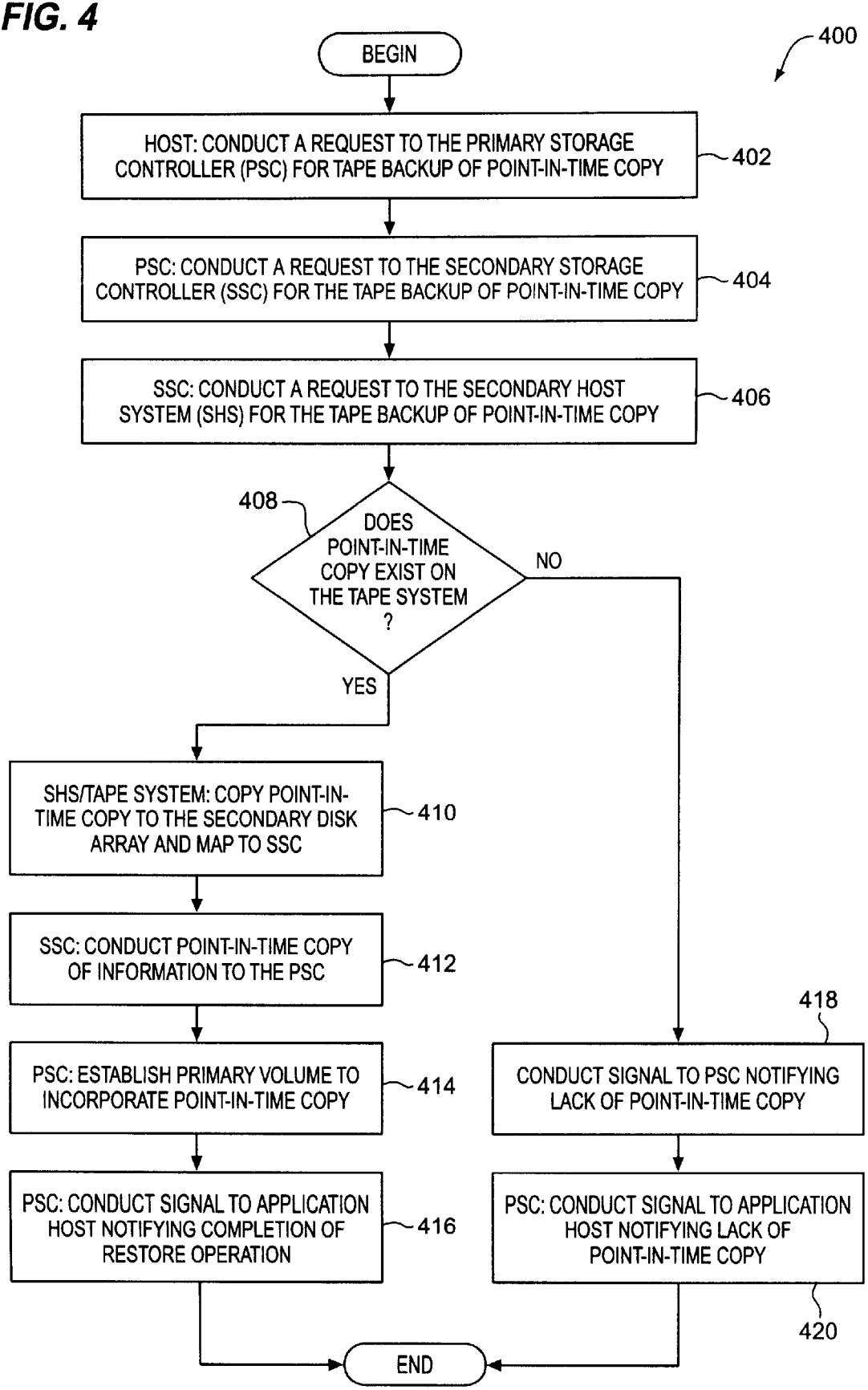
FIG. 4 is a flowchart of operations for performing the operational functions of an embodiment of the present invention wherein data is copied from the remote tape backup system to the local computer system, both shown in FIG. 1.
Figure 5:
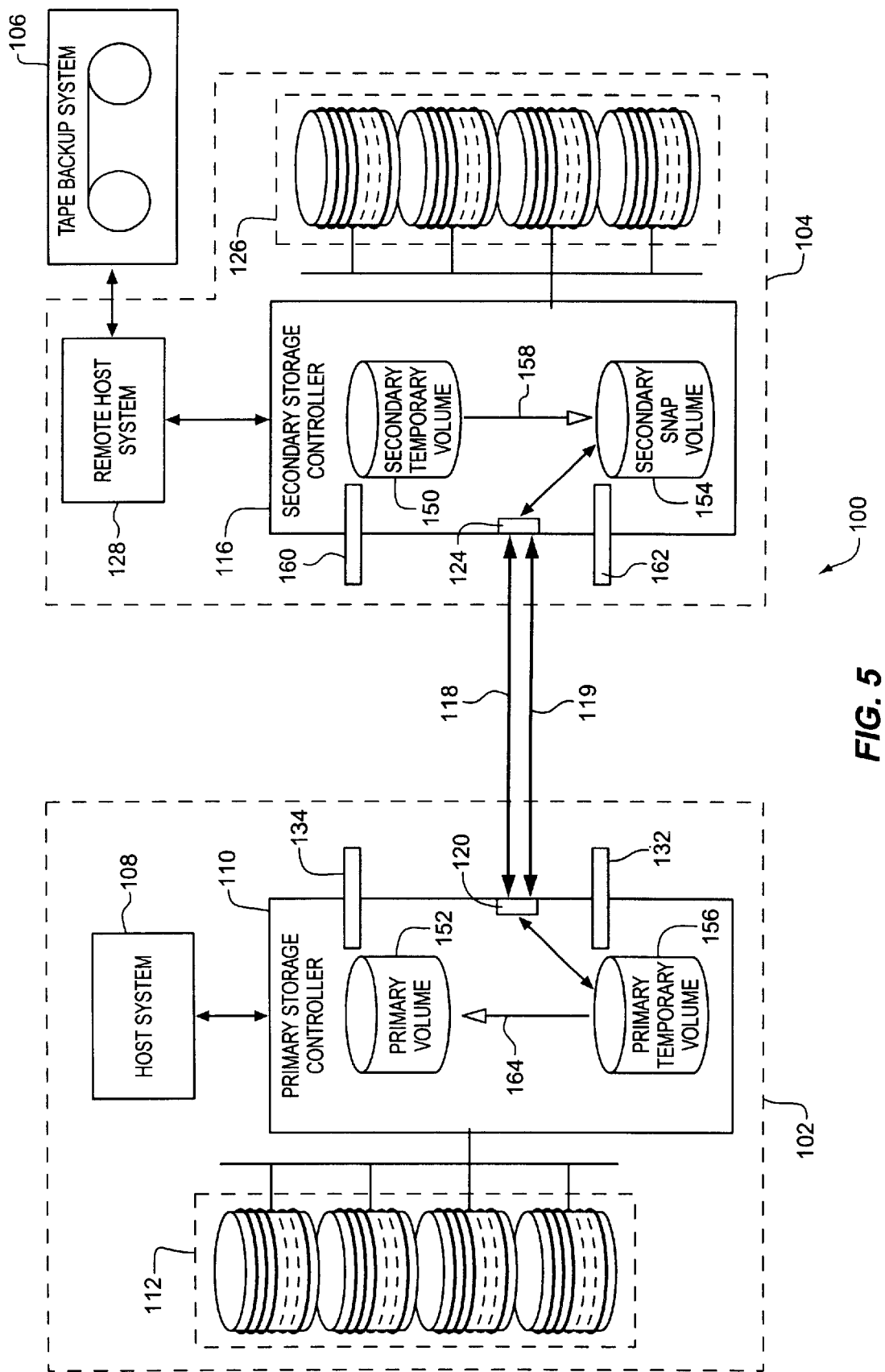
FIG. 5 is a block diagram of the computer system shown in FIG. 1 pictorially illustrating the transfer of data from the remote tape backup system to the local computer system.

The operational functions related to restoring process 400 of data from tape system 106 to the primary disk array 112 are shown in FIG. 4 and pictorially represented in FIG. 5. The process 400 begins with conduct operation 402 wherein the host computer 108 conducts a control signal to the primary storage controller 110 requesting a point-in-time backup copy of data. The request preferably includes information related to the particular volume and the particular time of the backup requested.

Following conduct operation 402, conduct operations 404 and conduct operation 406 relay the request from the host 108 to the secondary host 128. Specifically, operation 404 conducts the request from the primary storage controller 110 to the secondary storage controller 116. Operation 406, in turn, conducts the request from the secondary storage controller 116 to the secondary host 128.

Once the secondary host receives the request for the tape copy of a particular point-in-time copy, determination operation 408 determines whether such a tape backup copy exists on the tape system 106. Information related to the various copies located on the tape system is stored in memory, either on the tape system itself or on other memory accessible by the secondary computer 128. Preferably, the information is in the form of a lookup table, which enables a relatively quick determination as to whether the requested backup exists.

If the requested backup exists, flow branches YES and copy operation 410 copies the requested backup copy to the secondary disk array 126 as shown in FIG. 4. Additionally, this process maps a secondary volume 150 related to the copied data.

Following the copy operation 410, transfer operation 412 conducts a transfer of the backup copy from the secondary volume 150 within the secondary storage controller 116 to a corresponding volume 152 thereby creating a local point-in-time copy of the requested information on the disk array 112. Prior to such data transfer however, a control signal is preferably conducted to the primary storage controller 110 to establish a pair, i.e., a peer to peer connection, just as in the case of remotely copying from the primary to the secondary. The control signal interrupts the primary storage controller 110 and notifies the controller 110 that the copy is ready for transfer. Once the pair has been established the backup copy is transferred from the secondary volume 150 relatively directly to the primary volume 152.

Alternatively, and as shown in FIG. 5, a snap volume 154 is used to reduce the impact on the remote host system 128. That is, snap volume 154 is used as temporary or bridge volume, established in the manner described above with respect to FIG. 1, so the host 128 may access the secondary temporary volumes 150 as necessary. The snap processes for snap volumes 154 is represented by arrows 158 and bit map structures 160 and 162 can be used to facilitate partial volume restoration or snapping procedures based on bit map information. Moreover, a primary temporary volume 156 may be established to receive the point-in-time copy information as shown in FIG. 5. The data transfer is handled in the same manner as the data transfers from the primary to the secondary during normal backup, however, the data is transmitted in the opposite direction using link 119 to the temporary volume 156. The secondary system 104 is the transmitting system and the primary system 102 is the receiving system. Each controller 110 and 116 is configured to both send and receive data information along links 118 and 119.

Once the local point-in-time copy has been stored within the disk array 112 establish operation 414 establishes the primary volume 152 as having up-to-date physical location information related to the local point-in-time copy of information. Establish operation 112 either updates the primary volume with the local point-in-time copy physical location information or in an alternative embodiment, replaces the whole primary volume 152 with the temporary volume 156 information. Preferably however, the eventual location information is conducted to the secondary controller 116 at the time of the request operation 404. Therefore, establish operation 414 merely updates the primary volume 152 with the predetermined location information. Establish operation 414 is represented as arrow 164 (FIG. 5).

Upon completion of the replacement of the primary volume 152 with the point-in-time copy information volume, conduct operation 416 conducts a signal to the application host 108 notifying completion of the restore operation or process 400. The signal may automatically be conducted to the application host upon replacement of the primary volume, or such a signal may be delivered upon some other command or request. The host system 108 generally does not have access to the primary volume until receipt of this completion signal. Therefore it is preferable to automatically conduct the completion signal to the host notifying the host that it can access the primary storage controller 110 soon after completion of the establish operation 414.

Upon receipt of the completion signal by the host system 108, the restoration process 400 is complete.

If determination step 408 determines that a valid point-in-time tape backup copy does not exist, conduct operation 418 conducts a signal to the primary storage controller 110 notifying the controller 110 that the requested copy does not exist. Operation 418 may involve the conduction of a notification signal to the secondary storage controller 116 which then relays the notification signal to the primary storage controller 110.

Upon receipt of the control signal, conduct operation 420 causes the primary storage controller to conduct a similar notification signal to the application host 108 notifying the host 108 that no point-in-time copy exists. The restore process 400 ends following the receipt of this signal as no copy satisfies the initial request.

Partial volumes, extent levels of volumes, full volumes or other variations of identifiable memory locations can be restored from the tape system 106 according to process 400. In order to restore partial volumes, bit map information is sent to the secondary storage controller from the primary storage controller in its request for the point-in-time copy. The bit map information relates to the precise data or portions of data that is to be restored. The secondary storage controller correlates the bit map information to actual data located on the secondary disk array. Since the location of data on the secondary disk array is not necessarily the same as the location of the corresponding data on the primary disk array, some translation may be necessary. Since the secondary volume keeps track of corresponding data locations, the translation is relatively straightforward. In an alternative embodiment, the bit map of information may actually relate to data from more than one volume.

However, typically more data is copied to the secondary disk array 126 from the tape prior to parsing the information based on the bit map. Since the tape is typically copied in a serial manner, retrieving relatively small amounts from scattered locations may take more time than simply copying relatively large amounts of data, known to contain the desired information, to the disk. Therefore, initially, more data may be copied to disk, and the secondary storage controller then retrieves only the desired data.

An extent level is related to a set of tracks that is to be restored. Sets or ranges of physical tracks are identifiable and therefore can be restored as such. The process of restoring a partial volume using extent information is relatively the same as restoring using a bit map, except the process uses a start address and a count value to define a range of tracks to be copies instead of a bit representation of each track to be copied. The tracks that are restored may actually comprise information from more than one volume.

If the full volume is to be recovered then merely volume identification is conducted with the request. The secondary controller transfers a whole volume of information when receiving only the volume identification.

Figure 6:
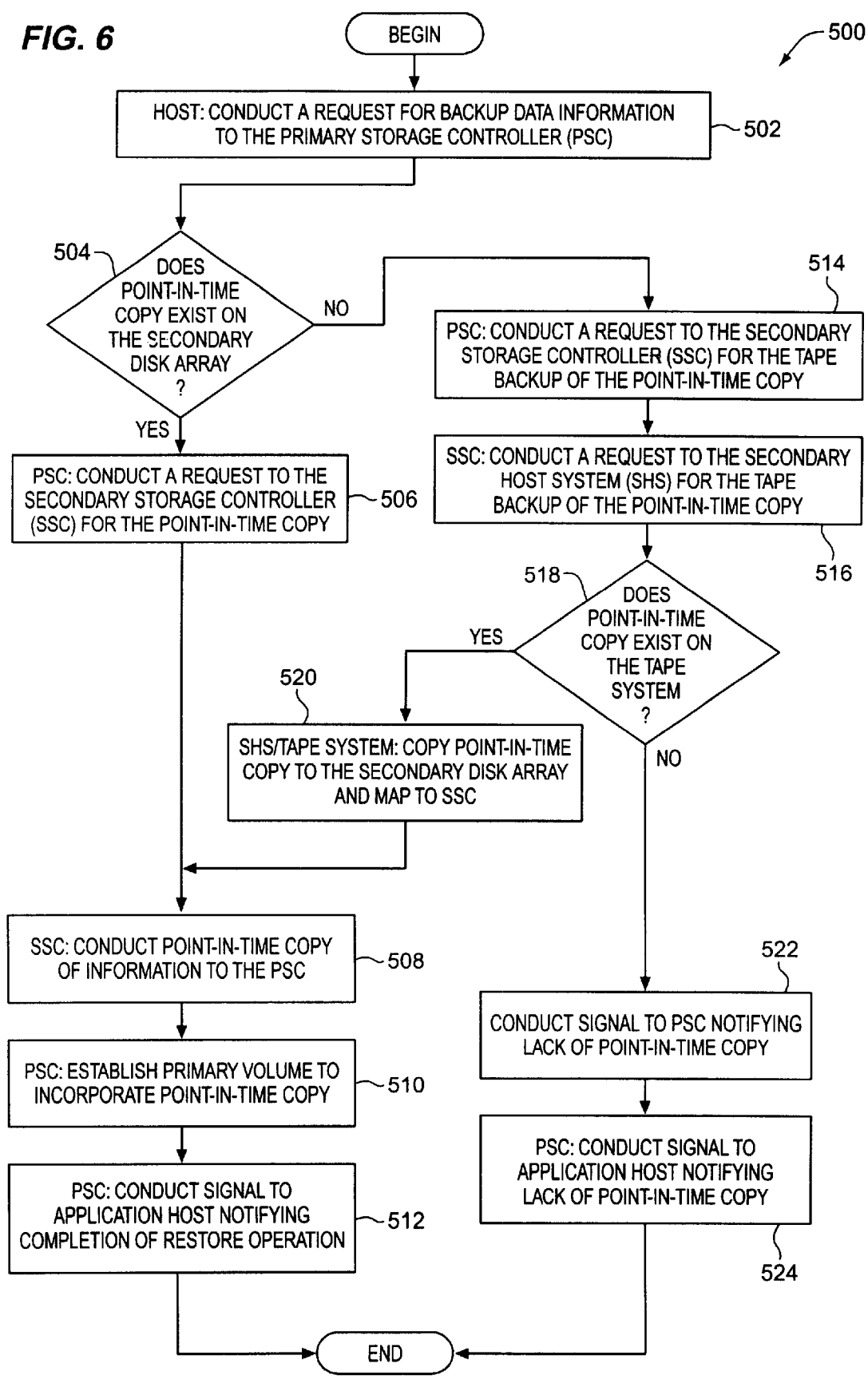
FIG. 6 is a flowchart of operations for performing the operational functions of an alternative embodiment of the present invention wherein data is copied from the remote tape backup system to the local computer system, both shown in FIG. 5.

The operational functions related to a preferred embodiment of the restoring process 500 of data from tape system 106 to the primary disk array 112 are shown in FIG. 6. The process 500 begins with conduct operation 502 wherein the host computer 108 conducts a control signal to the primary storage controller 110 requesting a point-in-time backup copy of data. The request preferably includes information related to the particular volume and the particular time of the backup requested. This operational step is similar to conduct operation 402 shown and described above with respect to FIG. 4 except the request is for a general point-in-time copy as opposed to a specific tape backup copy.

Upon receipt of the request from the host system 108, determine operation 504 determines whether a valid point-in-time copy of the data exists on the secondary disk array 126. Determination step 504 therefore, examines information related to the asynchronous remote copy process to determine whether a valid copy remains on the secondary disk array 126. Such a determination is done prior to searching the tape library system of 106 for the point-in-time copy.

If a valid point-in-time copy exists on the secondary array 126, flow branches YES to conduct operation 506, as shown in FIG. 6. Conduct operation 506 conducts a request from the primary storage controller 110 to the secondary storage controller 116 for the remote point-in-time copy located on the secondary array 126. Since the point-in-time copy exists, as determined by the primary storage controller 110 at operation 504, the primary storage controller 110 simply conducts a request to the secondary controller 116 requesting that secondary storage controller 116 return the point-in-time copy. The request signal is conducted along link 118 (FIG. 1) and is received at the secondary storage controller 116 through the interface 122 (e.g., 208 in FIG. 2), wherein the microprocessors associated with the secondary storage controller 116 recognize this type of request. Preferably, the requests are sent from the primary storage controller 110 to the secondary storage controller 116 using the ESCON interface protocol. The request identifies the requested information by volume and preferably time and date information. However, time and date information may not be necessary since the only copy at the secondary is most likely the desired point-in-time copy. Conducting the information, however, allows the secondary controller 116 to reaffirm the existence of a valid point-in-time copy, if desired.

Once the request for the remote point-in-time copy is received by the secondary controller 116, transfer operation 508 transfers the backup copy from the secondary volume 150 within the secondary storage controller 116 to the corresponding volume 152 in the primary storage controller 110. The transfer operation 508 thus creates a local pointin-time copy on the local disk array 112. Prior to such data transfer however, a control signal is preferably conducted to the primary storage controller 110 to establish a pair, just as in the case of remotely copying from the primary to the secondary. The control signal interrupts the primary storage controller 110 and notifies the controller 110 that the copy is ready for transfer. Once the pair has been established the backup copy is transferred from the secondary volume 150 directly to the primary volume 152. Operation 508 is relatively the same as operation 412 described above.

Alternatively, and as shown in FIG. 5, a snap volume 154 is used to reduce the impact on the remote host system 128. That is, snap volume 154 is used as temporary or bridge volume, established in the manner described above with respect to FIG. 1, so the host 128 may access the secondary temporary volumes 150 as necessary. The snap processes for snap volumes 154 is represented by arrows 158 and bit map structures 160 and 162 can be used to facilitate partial volume restoration or snapping procedures based on bit map information. Moreover, a primary temporary volume 156 may be established to receive the point-in-time copy information as shown in FIG. 5. The data transfer is handled in the same manner as the data transfers from the primary to the secondary during normal backup, however, the data is transmitted in the opposite direction using link 119 to the temporary volume 156. The secondary system 104 is the transmitting system and the primary system 102 is the receiving system. Each controller 110 and 116 is configured to both send and receive data information along links 118 and 119.

Once the point-in-time copy has been stored within the disk array 112 establish operation 510 establishes the primary volume 152 as having up-to-date physical location information related to the local point-in-time copy of information. Operation 510 is relatively the same as operation 414 described above. Upon completion of the replacement of the primary volume 152 with the point-in-time copy information volume, conduct operation 512 conducts a signal to the application host 108 notifying completion of the restore operation or process 500 in the same manner as operation 416 described above. Once the control signal is received by the host system 108, the restoration process 400 is complete.

Operations 502, 504, 506, 508, 510 and 512, shown in FIG. 6, relate to a process of retrieving a point-in-time copy of data located on the secondary array as described in more detail in the co-pending U.S. Patent Application titled RETRIEVING DATA FROM A DATA STORAGE SUBSYSTEM, as referenced above.

If no point-in-time copy exists on the secondary disk array, as determined by determination operation 504 then flow branches NO to conduct operation 514 as shown in FIG. 6. Conduct operation 514 conducts a request to the secondary controller for the tape backup copy, including relative identifying information such as time and volume. The conduct operation is the same as operation 404 described above in conjunction with FIG. 4. Operation 516, in turn, conducts the request from the secondary storage controller 116 to the secondary host 128 in a similar manner as operation 406 described above.

In an alternative embodiment, determination operation 504 is performed by the secondary storage controller 116. In such a case, the primary storage controller simply requests the backup and the secondary storage controller either finds the backup copy on the remote disk array and flow continues with operation 508 or the storage controller conducts the request to the secondary host 128 for the tape backup copy.

Once the secondary host 128 receives the request for the tape copy of a particular point-in-time copy, determination operation 518 determines whether such a tape backup copy exists on the tape system 106. Information related to the various copies located on the tape system is stored in memory, either on the tape system itself or on other memory accessible by the secondary computer 128. Preferably, the information is in the form of a lookup table, which enables a relatively quick determination as to whether the requested backup exists. This determination is similar to the determination operation 408 described above.

If the requested backup exists on the tape backup system 106, flow branches YES as shown in FIG. 6 and copy operation 520 copies the requested backup copy to the secondary disk array 126. Additionally, copy operation 520 creates and populates a secondary volume 150 related to the data copied to the secondary disk array 126. This step is relatively the same as operation 410 described above.

Following the copy operation 520, transfer operation 508 conducts a transfer of the backup copy from the secondary volume 150 within the secondary storage controller 116 to a corresponding volume 152 thereby creating a local point-in-time copy. Establish operation 510 then ensures the primary volume comprises the local point-in-time copy information. Conduct operation 512 conducts a completion signal to the host system 108. Operation 508, 510 and 512 are each described in more detail above. Upon receipt of the completion signal by the host system 108, the restoration process 500 is complete.

If determination step 518 determines that a valid point-in-time tape backup copy does not exist, conduct operation 522 conducts a signal to the primary storage controller 110 notifying the controller 110 that the requested copy does not exist. Operation 522 may involve the conduction of a notification signal to the secondary storage controller 116 which then relays the notification signal to the primary storage controller 110. Upon receipt of the control signal from the secondary controller 116, conduct operation 524 causes the primary storage controller 110 to conduct a similar notification signal to the application host 108 notifying the host 102 that no valid point-in-time copy exists. The restore process 500 ends following the receipt of this signal as no copy satisfies the initial request.

Partial volumes, extent levels of volumes, full volumes or other variations of identifiable memory locations can be restored from the tape system 106 according to process 500, as described above with respect to FIG. 4.

The above described processes and apparatus significantly increase the ability to store and retrieve backup information to and from tape backup system. By locating the tape backup system at the remote site, no shipping of tapes is required. The backups are created remotely and backup copies of information can be restored from the remote site to the local site yet the process is controlled from the local site even though the hosts 108 and 128 are not directly linked, i.e., they are indirectly linked through the storage controllers 110 and 116. Additionally, using the remote host computer 128 to drive the tape backup system 106 enables the local host 108 to perform normal operations during the backup window. Moreover, since a snap volume 140 is used to transfer the data from the secondary disk array 126 to the tape system 106, the secondary volume 124 is relatively free to receive asynchronous remote copies from the primary controller 110 during the backup window. Further still, the overall restoration process takes much less time using the above-described method since time is not wasted shipping the tapes back to the local site. Also, the restoration process only minimally impacts the host system 108 since the tape drive system 106 is substantially operated using the remote host 128.

Process 500 provides the benefit of retrieving the remote point-in-time copy from the remote disk array 126 if one exists. In such a case, the restoration process is substantially faster than in cases where the tape system 106 is used to restore the information since tape drives are relatively slower in locating and downloading data.

The above specification, examples and data provide a complete description of the manufacture and use of the composition of the invention. However, other embodiments are possible which do not depart from the spirit and scope of the invention. For example, the secondary volume 150 may be used to transfer the data from the disk array 126 to the tape system 106. The secondary volume 150 in this alternative embodiment, however, may not be accessible by the primary storage controller 110 during the transfer. Thus, there may be conflicts wherein the asynchronous data transfer must wait until the secondary volume 150 is available and therefore this alternative embodiment may not be preferred. Given these other possible embodiments, the invention of the present application is defined by the following claims.

What is claimed is:

1. A storage control system for creating a remote copy of data to a tape medium, the system comprising:
   a primary storage system having at least one local storage disk and a primary storage controller that controls the allocation of data located on the local storage disk;
   a remote storage system having at least one remote storage disk, and a secondary storage controller that controls the allocation of data on the remote storage disk, said secondary storage controller coupled to said primary storage controller to receive control signals from the primary storage controller, the secondary storage controller adapted to receive data transmissions from the primary storage controller and copy the data to the remote storage disk; and
   a tape backup system located at a remote site and coupled to the secondary controller, the tape backup system adapted to receive control signals from the secondary controller and data transmissions from the secondary controller, and adapted to copy data located on the remote storage disk to the tape medium in response to backup control signals from the secondary controller.

2. A storage control system as defined in claim 1 further comprising a remote host computer system coupled to the secondary controller and the tape backup system, the remote host computer system adapted to receive control signals from the secondary controller and responsively operate the tape backup system to copy data from the remote storage disk to the tape medium.

3. A storage control system as defined in claim 2 wherein the tape backup system asynchronously copies the data from the remote storage disk to the tape medium.

4. A storage control system as defined in claim 3 wherein the secondary storage controller further comprises a snap volume to facilitate the asynchronous copying of the data from the remote storage disk to the tape medium.

5. A storage control system as defined in claim 2 further comprising at least two bi-directional communication links coupling the primary storage controller to the secondary storage controller.

6. A storage control system as defined in claim 5 wherein the primary storage controller asynchronously conducts data to the secondary storage controller and wherein the primary storage controller further comprises a snap volume to facilitate the asynchronous transfer of data to the secondary controller.

7. A storage control system as defined in claim 2 wherein the primary storage controller synchronously conducts data to the secondary storage controller.

8. A storage control system as defined in claim 2 wherein the secondary storage controller further comprises:
   more than one volume of data; and
   a data structure comprising physical location information related to specific data located on the remote storage data disk, the data structure used by the tape backup system to copy portions of data from at least one volume located on the secondary storage controller.

9. A storage control system as defined in claim 8 wherein the secondary storage controller automatically conducts a control signal to the tape backup system to begin the tape backup procedure, the control signal conducted upon achieving a predetermined accumulation of changes on the remote storage disk.

10. A storage control system for retrieving a remote copy of data from a tape medium, the system comprising:
    a primary storage system having at least one local storage disk and a primary storage controller that controls the allocation of data located on the local storage disk;
    a remote storage system having at least one remote storage disk, and a secondary storage controller that controls the allocation of data on the remote storage disk, the secondary controller coupled to the primary storage controller to receive control signals from the primary storage controller;
    a tape backup system having tape medium located at a remote site and coupled to the secondary controller, the tape backup system adapted to receive control signals from the secondary controller, and adapted to copy data from the tape medium to the remote storage disk in response to restore control signals from the secondary controller;
    the secondary controller adapted to transmit the information stored on the remote storage disk by the tape backup system to the primary storage controller, thereby creating a local copy of the information on the remote tape backup.

11. A storage control system as defined in claim 10 further comprising a remote host computer system coupled to the secondary controller and the tape backup system, the remote host computer system adapted to receive restore control signals from the secondary controller and responsively operate the tape backup system to restore data from the tape medium to the remote storage disk.

12. A storage control system as defined in claim 11 wherein the secondary storage controller further comprises a snap volume to facilitate asynchronous copying of the data from the remote storage disk to the primary storage controller.

13. A storage control system as defined in claim 11 further comprising at least two bi-directional communication links connected to the primary storage controller and the secondary storage controller to couple the controllers together.

14. A storage control system as defined in claim 13 wherein the primary storage controller asynchronously conducts data to the secondary storage controller and wherein the primary storage controller further comprises a snap volume to facilitate the asynchronous transfer of data to the secondary controller.

15. A storage control system as defined in claim 11 wherein the secondary storage controller synchronously conducts data to the primary storage controller.

16. A storage control system as defined in claim 2 wherein the tape backup system is adapted to restore portions of more than one volume during a particular restoration process.

17. A storage control system as defined in claim 11 wherein the secondary storage controller further comprises memory allocated to store a lookup table that identifies remote copy occurrences and wherein the secondary storage controller is adapted to transfer the point-in-time copy located on the remote storage disk as indicated by the lookup table if such a valid copy exists in response to request for a point-in-time copy.

18. A storage control system for accessing a remote tape medium from a local host application system, the storage control system comprising:

a primary storage system coupled to the local host application system having at least one local storage disk and a primary storage controller that controls the allocation of data located on the local storage disk and adapted to receive tape access control signals from the local host application system;

a remote storage system having at least one remote storage disk and a secondary storage controller that controls the allocation of data on the remote storage disk, the secondary controller coupled to the primary storage controller to receive tape access control signals from the primary storage controller, the remote storage system further comprising a remote host computer system coupled to the secondary controller, the remote host computer system adapted to receive data transmissions from the secondary controller and tape access control signals from the secondary controller; and a tape backup system located at a remote site and coupled to the remote host computer system, the tape backup system adapted to receive tape access control signals and data transmissions from the remote host computer system, the tape backup system communicates with the remote host computer system to manage information on the tape backup system in response to tape access control signals conducted from the host application system.

19. A storage control system as defined in claim 18 wherein the tape access control signals are backup control signals and the tape backup system copies data stored on the remote storage disk to the tape medium in response to the tape access control signals.

20. A storage control system as defined in claim 18 wherein the tape access control signals are restore control signals and the tape backup system copies data stored on the tape medium to the remote storage disk in response to the tape access control signals.

21. A storage control system as defined in claim 18 wherein the tape access control signals comprise:

backup control signals and the tape backup system copies data stored on the remote storage disk to the tape medium in response to the backup control signals; and restore control signals and the tape backup system copies data stored on the tape medium to the remote storage disk in response to the restore control signals.

22. A method of storing data to a tape backup system from a primary storage system, wherein the tape backup system is remotely located from the primary system, said method comprising the steps of:

coupling the tape backup system to a remote secondary storage system having at least one remote storage disk and a secondary storage controller;

coupling the secondary storage controller to the primary storage system via a communications link;

transmitting data from the primary storage system to the secondary storage system; and transmitting data from the secondary storage system to the tape backup system.

23. A method of storing data to a remote tape backup system as defined in claim 22 wherein the data is transmitted to the tape backup system asynchronously.

24. A method of storing data to a remote tape backup system as defined in claim 23 wherein the secondary storage controller comprises a snap volume to enable the asynchronous transfer of data to the tape backup system.

25. A method of storing data to a remote tape backup system as defined in claim 22 wherein remote secondary storage system further comprises a remote host computer system and wherein the method further comprises the steps of:

conducting a first backup control signal from the primary storage controller to the secondary controller; and conducting a second backup control from the secondary controller to the remote host computer system in response to the first backup control signal to begin the tape backup process.

26. A method of storing data to a remote tape backup system as defined in claim 25 wherein the data is copied to the tape backup system using a high speed data mover and data compression.

27. A method of storing data to a remote tape backup system as defined in claim 25 wherein the tape backup system comprises robotic tape backup library.

28. A method of storing data to a remote tape backup system as defined in claim 25 wherein the method further comprises the following steps:

conducting an interrupt signal from the secondary storage controller to the remote host computer system indicating attention;

querying the secondary controller in response to the interrupt signal to determine whether a backup operation should be completed; and conducting a backup operation in response to the query results.

29. A method of storing data to a remote tape backup system as defined in claim 22 wherein the remote secondary storage system further comprises a remote host computer system and wherein secondary controller automatically conducts a backup control signal to the remote host computer system to begins the tape backup process in response to a predetermined condition occurring at the secondary controller.

30. A method of retrieving data from a remote tape backup system having a tape storage medium to a primary storage system, the primary storage system having at least one local storage disk, a primary storage controller for controlling the allocation of data on the local storage disk and a host computer system, the primary storage controller coupled to a remote storage system, the remote storage system having at least one remote storage disk and a secondary storage controller that controls the allocation of data on the remote storage disk, said method comprising the following steps:

coupling the tape backup system to the secondary controller;

conducting a first restore control signal from the primary storage controller to the secondary storage controller;

conducting a second restore control signal from the secondary storage controller to the tape backup system in response to the first restore control signal, copying data located on the tape medium to the remote storage disk as controlled by the secondary storage controller in response to the second restore signal thereby creating a remote point-in-time copy on the remote storage disk;

transferring the data associated with the remote point-in-time copy from the secondary storage controller to the primary storage controller thereby creating a local point-in-time copy; and configuring the primary system to access the transmitted data.

31. A method of retrieving data from a remote tape backup system as defined in claim 30 wherein the step of conducting a second restore control signal from the secondary storage controller to the tape backup system in response further comprises the following steps;

conducting the second control signal to a remote host computer system coupled to the secondary controller and adapted to control the tape backup system; and controlling the tape backup system in response to the second control signal.

32. A method of retrieving data from a remote tape backup system as defined in claim 31 wherein the method further comprises the following steps:

searching the remote disk array for a valid remote point-in-time copy prior to conducting the second restore control signal;

if a valid remote point-in-time copy is found, transferring the point-in-time copy to the primary storage controller; and if a valid remote point-in-time copy is not found, conducting the second control signal from the secondary controller to the remote host computer system.

* * * * *